(12) United States Patent
Maillot et al.

(10) Patent No.: US 8,859,659 B2
(45) Date of Patent: Oct. 14, 2014

(54) INK FOR PRINTING ON MOLDED PARTS, AND METHOD FOR USING SAID INK

(75) Inventors: Rene Maillot, Jonchery sur Vesle (FR); Eric Perraud, Courdimanche (FR); Anne Chabrol, Lyons (FR); Christophe Cuny, Jonchery sur Vesle (FR)

(73) Assignee: Arkema France, Colombes (FR)

( * ) Notice: Subject to any disclaimer, the term of this patent is extended or adjusted under 35 U.S.C. 154(b) by 62 days.

(21) Appl. No.: 13/518,005

(22) PCT Filed: Dec. 21, 2010

(86) PCT No.: PCT/FR2010/052851
§ 371 (c)(1),
(2), (4) Date: Dec. 3, 2012

(87) PCT Pub. No.: WO2011/086287
PCT Pub. Date: Jul. 21, 2011

(65) Prior Publication Data
US 2013/0072612 A1    Mar. 21, 2013

(30) Foreign Application Priority Data

Dec. 22, 2009  (FR) .................................. 09 59409

(51) Int. Cl.
*C08K 5/10* (2006.01)
*B28B 7/38* (2006.01)
*B29C 41/20* (2006.01)
*C08K 5/101* (2006.01)
*C09D 11/106* (2014.01)
*C09D 127/06* (2006.01)
*C08K 5/07* (2006.01)

(52) U.S. Cl.
CPC .............. *C09D 11/106* (2013.01); *B29C 41/20* (2013.01); *C08K 5/101* (2013.01); *C09D 127/06* (2013.01); *C08K 5/07* (2013.01); *C08K 5/10* (2013.01)
USPC ........................................... 524/315; 427/133

(58) Field of Classification Search
USPC ................................................... 524/315
See application file for complete search history.

(56) References Cited

U.S. PATENT DOCUMENTS 3,066,110 A * 11/1962 Cornell .......................... 524/114
3,323,943 A *  6/1967 Bromstead ................... 428/460

FOREIGN PATENT DOCUMENTS

FR          2 750 639 A1     1/1998

OTHER PUBLICATIONS

International Search Report of PCT/FR2010/052851 (Aug. 31, 2011).

* cited by examiner

*Primary Examiner* — Hui Chin
(74) *Attorney, Agent, or Firm* — Millen, White, Zelano & Branigan, P.C.

(57) ABSTRACT

The present invention relates to a method for obtaining a molded object made of laminated thermoplastic resin, said object having a high-quality printed surface. The present invention also relates to the resulting molded objects and to an ink specially suited for use in the above-mentioned method.

11 Claims, No Drawings

INK FOR PRINTING ON MOLDED PARTS, AND METHOD FOR USING SAID INK

The present invention relates to an ink composition intended to be used in a process for obtaining a molded part or object based on plasticized thermoplastic resin, which has a high-quality printed surface. The present invention also relates to the molded objects thus obtained.

In the motor vehicle industry, the preparation of composite coats or skins based on thermoplastic resin having a colored part is known. These composite skins are used for the most visible parts of motor vehicle interiors, in particular such as the dashboards, central consoles and door fittings. The presence of a colored part makes it possible to obtain the most varied visual effects, such as imitation leather.

Two processes exist in particular for obtaining a surface with a colored part on composite skins. The first process, "In-Mold Painting" or "In-Mold Pigmentation" (IMP), described in document EP 0 912 312 by the Applicant, comprises the following steps:
- deposition onto the surface of a mold of a composition A, which is colored, comprising at least one plasticizer and optionally one or more modifiers, such as coloration pigments, decorative flakes or a thermoplastic resin of PVC type,
- subsequent deposition of a composition B comprising a thermoplastic resin such as PVC,
- heating of the mold.

The second process, known as "In-Mold Coating" (IMC), is described in its principle in document WO 2004/060627 and also in U.S. Pat. No. 6,656,596; said document describes the production of a panel for a motor vehicle interior, having a multilayer structure obtained by successive deposition in a mold of a coating comprising an aqueous dispersion or a dispersion in a solvent of a polyurethane, of a dye and of a crosslinking agent, and of a coat containing polyvinyl chloride (PVC) and at least one plasticizer.

The processes described above unfortunately do not make it possible to obtain objects of optimum quality, especially when it is desired to obtain fine colored patterns or highly fragmented colored forms. The reason for this is that the colored compositions used in the processes defined above, by virtue especially of their rheological properties, cannot be sprayed onto a support other than by using paint spray guns. Since the diameter of the orifice through which the colored compositions are sprayed is large in the case of a paint spray gun, the printing accuracy is reduced and it is difficult to create certain patterns such as fine lines, and in particular dashed lines.

There is thus a need for a novel ink formulation which makes it possible to produce molded objects, based on plasticized thermoplastic resin, which has a high-quality printed surface.

Thus, the invention relates to a composition comprising, on a weight basis relative to the total weight of the composition:
- 5% to 20% and preferably 10% to 15% of at least one thermoplastic resin whose particles have a size of between 0.1 and 10 µm,
- 1% to 20% and preferably 5% to 15% of at least one modifier,
- 5% to 20% and preferably 10% to 15% of at least one plasticizer, and
- 45% to 75% and preferably 50% to 70% of at least one organic solvent.

As preamble, it will be noted that the term "between" should be interpreted in the present description as including the cited limits.

The above composition has a viscosity preferably of between 5 and 40 mPa·s and even more preferably of between 10 and 25 mPa·s at 20° C., measured with a viscometer of Brookfield® type.

The inventors have shown in example 3 that an ink whose composition is given above can be sprayed through printing nozzles of small diameter, for example with a diameter of 40 µm and even with a diameter of 30 µm or 20 µm in order to obtain a high-quality printed surface. It is thus possible to obtain a print at 360 or 720 dpi in one or two passes of the printing head over a support.

Preferably, the weight ratio of the thermoplastic resin to the plasticizer is between 1:0.1 and 1:2 and preferably between 1:0.5 and 1:1. This ratio makes it possible to obtain a resin that is particularly resistant to abrasion.

The thermoplastic resin(s) may be chosen from polyvinyl chloride, chlorinated polyvinyl chloride (CPVC), vinyl chloride copolymers, for example copolymers of vinyl chloride and of vinyl acetate, polyvinylidene fluoride, polyamides such as polyamide 11 and polyamide 12, high-density polyethylene and polymethyl methacrylate, and mixtures thereof.

Advantageously, polyvinyl chloride and polymethyl methacrylate and copolymers of vinyl chloride and of vinyl acetate are chosen.

Preferably, the thermoplastic resin is a polyvinyl chloride (or PVC) resin that may be obtained via an emulsion, suspension or microsuspension process. An example that may be mentioned is the resin sold under the name Pevikon® P1510 by the company Ineos.

For the purposes of the present invention, the term "modifier" means any compound that is capable of modifying the visual appearance of the molded objects, and especially pigments, decorative flakes and nacres.

The pigment(s) used may be either organic or mineral. Examples that may be mentioned include coated or uncoated metal oxides, for instance oxides of titanium (amorphous or crystallized in rutile and/or anatase form), iron, zinc, zirconium or cerium, and mixtures thereof.

Mention may be made especially of the yellow pigment sold by the company Ciba under the name Jaune Cromophtal® PV H3R, the titanium dioxide sold by the company Kronos under the name Kronos® 2220, and the blue pigment sold by the company Ciba under the name Cromophtal® 4GNP, and mixtures thereof.

Flakes are generally used to make the object more attractive. The content of flakes in the manufactured object is generally between about 5 and about 50 g/cm$^2$. Flakes based on titanium oxide covered with mica are preferably used.

The pigment used in the composition that is the subject of the invention may be in the form of a pigmentary paste, comprising a mixture of pigment and of solvent or a mixture of pigment and of plasticizer, optionally mixed with a dispersant.

The plasticizer used in the composition that is the subject of the invention is a plasticizer that is compatible with the thermoplastic resin. The plasticizer may be chosen from esters formed from organic alcohol and acid such as trimellitic acid, sebacic, adipic, phthalic, citric, benzoic, tallic, glutaric, fumaric, maleic, oleic, palmitic or acetic acid. The plasticizer may be chosen especially from octyl trimellitate, dioctyl phthalate, nonyl undecyl phthalate, dioctyl adipate, tricresyl phosphate and trimethyl pentanyl diisobutyrate, and mixtures thereof.

Phthalates and trimellitates are usually used, in particular octyl trimellitate.

Examples that may be mentioned include the products sold by the company Polynt under the names Diplast® TM/ST and Diplast® TM79, the products sold by the company Adeka Palmarole under the name Cizer® C8L, and the products sold by the company Eastman under the name TXIB®.

Mixtures of these products may be used as plasticizer.

The organic solvent used in the composition that is the subject of the invention is a solvent whose boiling point is preferably at least equal to 200° C. The use of such a solvent makes it possible to avoid excessively rapid vaporization at the time of application of the composition that is the subject of the invention to a molded part, and thus to prevent operators from coming into contact with volatile organic compounds.

Preferably, the organic solvent is chosen from isophorone, pentyl acetate, alkyl lactates, in particular ethyl lactate, dibasic esters of adipic, glutaric and succinic acids, and mixtures thereof, in particular mixtures of dimethyl adipate, dimethyl glutarate and dimethyl succinate.

An example of a solvent that may be mentioned is the product sold by the company ExxonMobil under the tradename Exxsol D140®.

In order to vary the viscosity within the ranges defined above, a rheology additive may be added. In particular, it may be necessary to lower the viscosity of the composition that is the subject of the invention by using a viscosity reducer. This may be a volatile diluent, an emulsifier or a protective colloid. The diluents may in particular include low-boiling hydrocarbons such as $C_{10}$-$C_{16}$ hydrocarbons. The emulsifiers include fatty acid salts or esters, condensates of ethylene oxide with phenylalkyls, or fatty alcohols, zinc/magnesium octoate. The protective colloids are, for example, lecithins. The amount of rheology additive added to the composition that is the subject of the invention is generally from 5 to 100 parts by weight per 100 parts by weight of thermoplastic resin.

Examples of rheology additives that may be mentioned include the carboxylic acid esters sold under the tradename Viscobyk 5100® by the company Byk Chemie GmbH.

The composition that is the subject of the invention may also comprise one or more additives chosen from fillers, stabilizers, antioxidants, processing additives, lubricants or flame retardants. In particular, among the additives commonly used in compositions based on vinyl resin, mention may be made of metal salts of organic carboxylic acids, organic phosphoric acids, zeolites, hydrotalcites, epoxide compounds, β-diketones, polyhydric alcohols, phosphorus-containing, sulfur-containing or phenolic antioxidants, ultraviolet absorbers, for example benzophenones, benzotriazoles and oxanilide derivatives, cyanoacrylates, hindered amine light stabilizers or HALS, alkoxyamine hindered amine light stabilizers or NOR-HALS, especially the products sold by Clariant under the name Hostavin Now®, perchloric acid salts, and other metal-based inorganic compounds, lubricants, for example organic waxes, fatty alcohols, fatty acids, esters, metal salts, fillers, for example chalk or talc, and expanders, for example azodicarbonamides.

As indicated above, the composition that is the subject of the invention is intended to be used in a process for obtaining a molded object.

A subject of the invention is thus also a molded object comprising a composition as defined above. For the purposes of the present invention, the term "molded object" means an object obtained from a mold. By way of example, said object may be chosen from a part of a vehicle dashboard, a leathercraft article, or a saddle.

The molded objects comprising a composition as defined above may be intended for any field in which it is desired to make molded objects, in particular imitation-leather molded objects, and may especially be intended for the manufacture of a part for the interior of a motor vehicle, preferably the inner doors, the central console and the armrests, a leathercraft article, preferably a handbag, a traveling bag and a saddle.

A subject of the invention is also a process for obtaining a molded object having a printed surface, said process comprising the following successive steps:

(i) deposition of a coat of composition (A) as defined above onto a mold, (ii) heating of the mold to the point of gelling of composition (A), (iii) deposition on the partly or totally coated mold obtained in (ii) of a coat of composition (B) comprising a thermoplastic resin or a thermoplastic resin mixture, and (iv) heating of the mold to the point of gelling of composition (B).

Preferably, during step (i), printing nozzles with a diameter of less than or equal to 40 μm and preferably with a diameter of 30 μm or 20 μm are used to deposit the coat of composition (A).

An example that may be mentioned is the use of the Omnidot® 760 GS8 printing nozzle from the company Xaar, Cambridge, United Kingdom.

During step (ii), the temperature of the mold increases gradually, this gradual increase in the temperature allowing the gelling of composition (A).

The term "gradual increase in the temperature" means a heating rate of not more than 40° C. per minute.

The gelling temperature is generally between 150° C. and about 300° C. It is chosen as a function of the nature of the thermoplastic resin to be transformed.

Thus, preferably, composition (A) used during step (i) comprises a polyvinyl chloride resin, and, during step (ii), the mold is heated to a temperature of between 180° C. and 260° C. and preferably between 230° C. and 300° C.

Thus, preferably, during step (ii), the temperature of the mold partly or totally coated with composition (A) rises from about 40° C. to about 240° C., and composition (A) is gelled during this temperature increase.

Composition (B) comprises a thermoplastic resin preferably chosen from polyvinyl chloride (PVC) or a mixture of PVC and of a compatible polymer chosen from copolymers or terpolymers of vinyl chloride and vinyl acetate (VC/VA) or of vinyl chloride and an acrylic derivative (VC/AD), thermoplastic polyurethanes (TPU), thermoplastic polyether esters, ethylene/vinyl monomer copolymers (EVA), ethylene/vinyl monomer/carbonyl terpolymers, melt-processible acrylic elastomers, copolymers containing polyamide blocks and polyether blocks or polyether block amides, chlorinated or chlorosulfonated polyethylenes, functionalized or non-functionalized ethylene/alkyl (meth)acrylate or (meth)acrylic acid polymers, core-shell polymers of MBS type, SBM block terpolymers, PVDF and polyamide resin powder. According to one preferred embodiment of the invention, the thermoplastic resin used is a polyvinyl chloride (PVC) with a K-value of between 50 and 80.

According to one embodiment, the thermoplastic resin of composition (B) is polyvinyl chloride (PVC) obtained via a suspension or microsuspension process, but PVC manufactured via an emulsion or bulk process may also be used. An example of a VC/VA copolymer is Lacovyl® from Arkema, an example of a VC/AD copolymer is Vinnolit® from Vinnolit, an example of a TPU is Estane® from Goodrich, an example of a thermoplastic polyether ester is Hytrel® from DuPont, an example of a polyether block amide is Pebax® from Arkema, an example of an EVA is Evatane® from Arkema, an example of an ethylene/vinyl monomer/carbonyl terpolymer is Elvaloy® from DuPont, examples of functionalized or non-functionalized ethylene/alkyl (meth)acrylate or (meth)acrylic acid polymers are Lotryl®, Lotader® and Orevac® from Arkema, an example of chlorinated or chlorosulfonated polyethylenes is Tyrin® from DuPont, an example of a melt-processable acrylic elastomer is Alcryn® from Apa, and an example of a polyamide resin powder is Orgasol® from Arkema. These polymers that are compatible with PVC, known as "alloys", have good cold properties, and are capable of imparting suitable fragility to the coats containing them.

Composition (B) may thus comprise mixtures of thermoplastic resins comprising PVC resins and copolymers or terpolymers of vinyl chloride and vinyl acetate (VC/VA) or of vinyl chloride and an acrylic derivative (VC/AD), and also PVC resins and thermoplastic polyurethanes (TPU). These various resins may be mixed together in wide proportions.

Composition (B) may also comprise a plasticizer or a plasticizer mixture as defined above. The weight ratio of the thermoplastic resin to the plasticizer in composition (B) is then between 1:0.1 and 1:2 and preferably between 1:0.5 and 1:1. This ratio makes it possible to obtain a resin that is particularly resistant to abrasion.

During step (iii), composition (B), preferably in powder form, may be deposited onto the mold according to the usual molding techniques such as spraying, rotary molding or slush molding.

Spraying consists in depositing a powder onto the mold based on an electrostatic effect. The rotary molding consists in applying a strictly necessary amount of powder into the mold while at the same time applying rotational motions on the mold, which enables the powder to become deposited on the surface of the mold. When an amount of powder greater than that necessary for the rotational deposition is introduced into the mold, the excess amount after deposition of the powder onto the mold may be removed by gravity. This technique is known as slush molding. The latter deposition technique is particularly preferred. In slush molding, composition (B) in powder form is deposited onto the mold totally or partly coated with composition (A) by rotation of the entire device that comprises the mold and also the reservoir for depositing composition (B). The number of rotations of the device is chosen as a function of the desired thickness of the coat of composition (B).

In general, composition (B) is deposited onto the mold at the gelling temperature of composition (A). Composition (B) advantageously in powder form is thus poured or applied onto the mold at a temperature of between 150° C. and 300° C., preferably between 180° C. and 260° C. and most preferably between 230° C. and 250° C. During the application of composition (B) to the mold, the mold temperature may decrease down to a temperature of between 130° C. and 190° C.

In order for the coat of composition (B) to adhere correctly to the mold partly or totally coated with composition (A), the temperature of application of composition (B), known as the powdering temperature, must be within the ranges defined above. Specifically, during step (iii), the first grains of composition (B) that fall onto the mold must gel rapidly and stick to the mold. The following grains stick to the first grains and also gel by mixing their PVC chains with those of the neighboring grains (interpenetration of the PVC chains).

If the temperature is too low, the first grains cannot begin to gel and therefore will not stick to the shell. The grains of PVC resin will not stick together: a poorly gelled porous structure would be obtained.

During step (iv), the mold is heated to the point of gelling of composition (B), i.e. preferably to a temperature of between 150° C. and 300° C. It is chosen as a function of the nature of the thermoplastic resin to be transformed. Thus, for polyvinyl chlorides, it is advantageously between 180° C. and 260° C. and preferably between 230° C. and 250° C.

At the gelling temperature, it is possible either once again to perform steps (III) and (IV) one or more times, or to wait for total gelling of the thermoplastic resin before cooling the mold, for example by immersing it in water at room temperature.

Any type of mold that allows gradual heating in the presence of a thermoplastic resin may be suitable for the process according to the present invention.

Advantageously, jacketed molds with circulation of a heat-exchange fluid are used.

Steps (i) and (ii) may be separated over time and in space, such that step (i) may take place on a different production site from that on which step (ii) is performed.

The process according to the present invention may be used in the field of decoration and pigmentation with a saving of ingredients. It also makes it possible to improve the feel of the surface of the objects thus manufactured. Furthermore, it makes it possible to improve the adhesion between two coats based on thermoplastic resin of different natures.

The invention will be understood more clearly with the aid of the examples that follow.

EXAMPLE 1

White Printing Formulation

A composition according to the invention (white ink) is prepared by mixing the various constituents presented in table 1 below, according to the techniques known to those skilled in the art in the formulation and preparation of inks.

The plasticizer, the stabilizer, the viscosity reducer and the solvents are first mixed for 5-10 minutes at 1000 rpm using a disperser.

The PVC resin is then gradually introduced into the mixture, the introduction time being between 2 and 5 minutes at 500 rpm.

Heating of the mixture is often observed, due to the shear stresses. The mixture is thus preferentially prepared in a mixer whose temperature is controlled (T=23° C.) To control the temperature, it is also possible to vary the stirring speed in the disperser.

The viscosity reducer is introduced before the PVC resin in order to obtain a pronounced viscosity lowering effect. The viscosity reducer may also be introduced at the very end of the ink manufacturing process, with an introduction time of 10 minutes, with stirring at 500 rpm, but the viscosity lowering effect would be smaller.

The stabilizer could have been introduced at the very end of the ink manufacturing process, with an introduction time of 5 minutes, with stirring at 500 rpm.

A resin dispersion is obtained.

The solvents may also be introduced before and/or after the resin or may be partially introduced before and after.

The white pigment is then introduced into the mixture in powder form, with an introduction time of 30 minutes, with stirring at 500 rpm.

TABLE 1

| composition according to the invention (white ink) | | |
|---|---|---|
| White base for PVC ink | | Amount (in g) |
| PVC resin | Pevikon ® P1510 (Ineos) | 15 |
| Plasticizer | Trimellitate Diplast ® TM79 (Polynt) | 9 |

TABLE 1-continued composition according to the invention (white ink)

| White base for PVC ink | | Amount (in g) |
|---|---|---|
| Solvents | Isophorone (Brentag) | 20 |
| | Pentyl acetate (Brenntag) | 22 |
| | Exxsol ® D140 (ExxonMobil) | 21 |
| Viscosity control agent | Viscobyk ® 5100 (Byk Chemie) | 5 |
| Heat stabilizer | Lastab ® 375 T (Lagor) | 0.5 |
| Titanium oxide: TiO$_2$ | Sachteleben RDI-S ® (Sachteleben) | 7.5 |

EXAMPLE 2

Measurement of the Viscosity of Brookfield® Type and of the Particle Size

For inkjet use, the viscosity measured at 20° C. using a Brookfield viscometer must be less than 30 mPa·s and preferably less than 20 mPa·s.

The viscosity of the composition of example 1 was measured at 23° C. using a Brookfield DV-II+ Pro® viscometer at 60 rpm. The viscosity is 11.1 mPa·s.

The size of the particles present in the composition of example 1 was measured. The particles have a diameter of less than 2 μm.

EXAMPLE 3

Printing Test (Step (i) of the Process That is the Subject of the Invention)

The composition according to the invention (example 1) is printed on a mold using a piezoelectric inkjet printer equipped with a Xaar Omnidot® 760 GS8 printing head (from the company Xaar, Cambridge, United Kingdom).

The types of printing performed are the following:
test 1: a predefined pattern is printed on a mold, in a single pass at 360 dpi; a printed pattern is obtained, with good resolution, i.e. a very sharp pattern contour, but whose opacity could be stronger;
test 2: a predefined pattern is printed on a mold, in two passes at 360 dpi. The ink thickness deposited is greater than for test 1, and the pattern obtained is thus more opaque than for test 1, and the pattern contour is slightly less sharp;
test 3: a predefined pattern is printed on a mold, in a single pass at 720 dpi. The pattern obtained is more opaque than for test 1, and the pattern contour is very sharp. The printing quality is even better than for tests 1 and 2.

EXAMPLE 4

Printing Test (Steps (ii) to (iv) of the Process That is the Subject of the Invention)

The pre-printed mold of test 3 is used to perform the slush molding process.

The mold is heated for 4 minutes in a hot-air oven, T=295° C.

After the 4 minutes of heating, the mold is removed from the oven and plasticized PVC powder is spread over the surface. The mold temperature is then 210° C.

The mold is then manipulated so as to ensure uniform distribution of the powder over the surface.

Twenty seconds after pouring the powder onto the mold, the excess powder that has not gelled is removed by turning the mold over. The mold is then lined with a coat of plasticized PVC powder in the course of gelling, and it is returned to the oven for 70 seconds of heating.

After this step of gelling the plasticized PVC powder, the mold is removed from the oven and immersed in a tank of cold water (T=23° C.) for 90 seconds.

The mold is then dried by spraying with compressed air and the skin thus formed is stripped from the mold.

A plasticized PVC skin bearing a printed pattern is obtained.

EXAMPLE 5

Color Juxtaposition Test

A red ink is used in this example. Its composition is similar to the formulation given in example 1, but the titanium oxide pigment is replaced with 2% of Red No. 214 pigment sold under the name Fast Red BNP by the company Clariant.

The printing test of example 3 is then repeated while juxtaposing a second printing head fed with the red ink next to the preceding printing head fed with the white ink.

A predefined two-color pattern is then printed on a mold, in a single pass at a definition of 360 dpi.

A PVC skin is then produced by repeating the procedure described in example 4.

The printed red and white pattern shows good opacity.

The print quality of the two inks is good, with excellent contrast obtained via a sharp separation at the interface of the patterns of the two colors.

The invention claimed is:

1. A composition comprising, on a weight basis relative to the total weight of the composition:
   5% to 20% of at least one thermoplastic resin whose particles have a size of between 0.1 and 10 μm,
   1% to 20% of at least one modifier,
   5% to 20% of at least one plasticizer, and
   45% to 75% of at least one organic solvent, and
   one or more antioxidants.

2. A molded object having a printed surface produced from a composition (A) comprising, on a weight basis relative to the total weight of the composition:
   5% to 20% of at least one thermoplastic resin whose particles have a size of between 0.1 and 10 μm,
   1% to 20% of at least one modifier,
   5% to 20% of at least one plasticizer, and
   45% to 75% of at least one organic solvent.

3. The object as claimed in claim 2, wherein the composition has a viscosity of between 5 and 40 mPa·s at 20° C.

4. The object as claimed in claim 2, wherein the composition has a weight ratio of the thermoplastic resin to the plasticizer between 1:0.1 and 1:2.

5. The object as claimed in claim 2, wherein the thermoplastic resin is a polyvinyl chloride resin.

6. The object as claimed in claim 2, wherein the solvent is isophorone, pentyl acetate, alkyl lactates, dibasic esters of adipic, glutaric or succinic acids, or mixtures thereof.

7. The molded object as claimed in claim 2, that is a part for the interior of a motor vehicle, a leather-craft article, a traveling bag or a saddle.

8. The molded object as claimed in claim 2, wherein composition (A) further comprises one or more antioxidants.

9. A process for obtaining the molded object of claim 2, having a printed surface, said process comprising the following successive steps:
 (i) deposition of a coat of the composition (A) onto a mold,
 (ii) heating of the mold to the point of gelling of composition (A),
 (iii) deposition on the partly or totally coated mold obtained in (ii) of a coat of composition (B) comprising a thermoplastic resin or a thermoplastic resin mixture, and
 (iv) heating of the mold to the point of gelling of composition B.

10. The process as claimed in claim 9, wherein during step (i), printing nozzles with a diameter of less than or equal to 40 µm are used to deposit the coat of composition (A).

11. The process as claimed in claim 9, wherein composition (A) used during step (i) comprises a polyvinyl chloride resin, and, during step (ii), the mold is heated to a temperature of between 180° C. and 260° C.

* * * * *